United States Patent [19]
Murakami et al.

[11] Patent Number: 5,129,016
[45] Date of Patent: Jul. 7, 1992

[54] SYSTEM FOR REGISTRATION OF DOCUMENTS

[75] Inventors: Tatsuya Murakami, Tachikawa; Yasuaki Nakano, Hino; Masaaki Fujinawa, Nishitama; Hiromichi Fujisawa, Tokorozawa, all of Japan

[73] Assignee: Hitachi, Ltd., Tokyo, Japan

[21] Appl. No.: 604,374

[22] Filed: Oct. 29, 1990

Related U.S. Application Data

[63] Continuation of Ser. No. 309,014, Feb. 10, 1989, abandoned, which is a continuation of Ser. No. 48,599, May 11, 1987, abandoned.

Foreign Application Priority Data

May 16, 1986 [JP] Japan .................. 61-110769

[51] Int. Cl.⁵ .................................. G06K 9/00
[52] U.S. Cl. ............................ 382/61; 358/403
[58] Field of Search ................ 382/61, 57, 48; 358/403

[56] References Cited

U.S. PATENT DOCUMENTS

| | | | |
|---|---|---|---|
| 3,872,433 | 3/1975 | Holmes et al. | 382/61 |
| 4,021,777 | 5/1977 | Shepard | 382/61 |
| 4,408,181 | 10/1983 | Nakayama | 382/61 |
| 4,677,551 | 6/1987 | Suganuma | 382/61 |
| 4,677,585 | 6/1987 | Ikegami et al. | 382/61 |

Primary Examiner—David K. Moore
Assistant Examiner—Yon Jung
Attorney, Agent, or Firm—Antonelli, Terry, Stout & Kraus

[57] ABSTRACT

This invention relates to a document image registration system which adds a code which is referred to as "connection data" and inherent to each document to each of image data and indexing data, registrates the connection data added to the image data by use of a header sheet, and automatically associates the image data with the indexing data through the connection data in order to improve efficiency of registration.

26 Claims, 4 Drawing Sheets

| TYPE | PRINT SIDE | FRONT/RIVERSE | CODE |
|---|---|---|---|
| BOOK TYPE | BOTH SIDES | FRONT SIDE | F |
| | | RIVERSE SIDE | B |
| | ONE SIDE | / | G |
| TAB TYPE | ONE SIDE | / | SG |

SYSTEM FOR REGISTRATION OF DOCUMENTS

This application is a continuation of U.S. application Ser. No. 309,014, filed on Feb. 10, 1989 which is a continuation of U.S. application Ser. No. 048,599 filed May 11, 1987 both now abandoned.

BACKGROUND OF THE INVENTION

This invention relates generally to an image registration system for an image filing system which stores the images of documents or the like in a file, and more particularly to a system which registrates at one time and highly efficiently a large quantity of images.

When the images of documents or the like are registrated in an image filing system, keywords for search and UDC codes must be registered as a data base. In addition, bibliographic data such as the title, authors, etc. of the originals must also be registered with the keywords in order to accomplish an efficient search.

In accordance with the conventional registration system, whenever one image is inputted or after only a plurality of images are inputted at one time, the keyword and the bibliographic data (hereinafter called the "registration data") are inputted manually. In this system, when a document consisting of a large number of pages of images (hereinafter called the "book type document") is registered, the input work of the registration data may be made once per document. However, in order to display later the original document images in the original sequence (or in the correct page sequence), the input work of the images must be made in accordance with the sequence of a page or a sequence number must be inputted for each sheet of image.

On the other hand, there has been proposed a system which allots a serial number (document ID number) to each of the input images inputted in a file, registers the document ID number as an index code and eliminates the manual input work of the registration data (e.g. Japanese Patent Laid-Open No. 2222/1981). However, this system does not consider the case where a plurality of kinds of documents are registered in the same file.

Another system is known in the art which designates part of a character string on the input image, reads the designated character string by character recognition and registrates the result as the index code (e.g. Japanese Patent Laid-Open No. 17565/1985). However, this system is directed only to registration of those documents which are described in a particular format. In other words, the system does not consider registration of ordinary documents having unspecified formats.

Among the conventional systems described above, one that inputs the registration data for each document involves the problem of low registration efficiency because the input works of the images and the registration data are made by turns from the keyboard or the like. The system which inputs the registration data while displaying the images that have once been inputted is not free from the problem of low efficiency because processings such as display, confirmation and input must be made by turns.

When a book type document is registered, a plurality of images must be displayed one after another when they are displayed. The sequence of the images displayed at this time is the same as that of registration. It has therefore been necessary conventionally either to input the images in accordance with the sequence number or to sequentially input the sequence number for all the images. However, most of the book type documents are written on both sides of each sheet. Therefore, in order to input them in accordance with the sequence number, the front and reverse sides of one sheet must be inputted continuously so that efficiency of the input work is low. The system which sequentially inputs the sequence number for all the images must display and confirm the image one sheet by one so that efficiency is low, too, and mistakes are more likely to occur with an increasing number of pages.

On the other hand, the system which allots a serial number to each image in accordance with its input sequence and registrates it automatically as an index code has high registration efficiency but is not free from the drawback that the data that can be used for search is only the input sequence so that search in accordance with the content cannot be made.

Furthermore, the system which designates part of the character string in the input image, reads the character string by character recognition and registrates the result as the index code is effective if the object of registration is limited to a specific document. However, since unspecified documents are registered generally in ordinary image filing systems, the format of each document to be registered is different, and in order to input the character string by character recognition processing, the position and format of the character string must in advance been inputted to the system. In other words, an operator must input the format of the character string as the object of character recognition for each document. For these reasons, this system may not be suitable for registration of ordinary documents having unspecified formats. This system may not be suitable, either, for registration of book type documents consisting of a plurality of pages because it reads the index code from each image.

SUMMARY OF THE INVENTION

It is an object of the present invention to provide a registration system having high efficiency which automatically establishes correspondence between an input image and registration data for searching in order to possible to input separately the image and the registration data such as index code, automatically allots a sequence number to each image even when a document to be registered is a book type document consisting of a plurality of pages so that the input work can be made separately from the sequence number and the input work of the image can be made by an automatic feeder, and can readily notify the operator of the system of the occurrence of mistakes when the mistakes hindering registration take place during registration.

To accomplish the object described above, the present invention records data designating individual documents on a data base of registration data on which index data for searching the image are recorded. (This data will be hereinafter called "connection data". The connection data includes classter of each document and a document number which is an inherent number in each class.)

In other words, the registration data for search and connection data are stored in the data base of registration data in association with each other. According to this system, when the document image containing the connection data is inputted, the document image is automatically associated with the registration data, by use of the connection data and the user of the system can rewrite the registration data independently of the document image input, whenever necessary.

When the document is inputted, a sheet describing the codes of data called "document information data" relating to the input texts (hereinafter called the "header sheet") is first inputted. The document information data includes the connection data and those data which is called "formatting data". The formatting data represent by predetermined codes includes the number of pages of the object document, its form type (or whether the document is a tab type document consisting of one image or a book type document consisting of a plurality of images) and its entry type (or whether the document is written on both sides of a sheet or only on one side).

The system confirms that the input image is the header sheet for each input image, reads the entry data by character recognition, and inputs the result. Next, the document image of one document is inputted and finally, a trailer sheet is inputted. The system counts the number of sheets of the images that are inputted and stores the data of each image in a buffer. Finally, the trailer sheet is inputted. When detecting the image of the trailer sheet, the system compares the number of the images that have so far been inputted with the number of sheets that is described in the header sheet and if they are in agreement with each other, the system records the data in the buffer and the connection data in the document information data read from the header sheet on the image data base. If they are not in agreement with each other, on the other hand, the system raises a necessary alarm. Incidentally, processing is carried out similarly even when the number of the input images exceeds the number of sheets described in the header sheet. The image thus registered is made to correspond to the registration data having the same connection data inside the data base of registration data by the connection data added thereto.

The processing described above can accomplish high efficiency registration.

More particularly, when the system detects the image of the trailer sheet, it compares the number of images that have so far been inputted after the input of the header sheet with the number of sheet described in the formatting data in the header sheet. If they are found coincident as a result of comparison, the system determines that all the images of the document are inputted correctly, adds the connection data to the data in the buffer and records them on the image data base. The connection data which is the same as the connection data added to each image is found out from the registration data in the data base of registration data and thus the registration data in the data base of registration data can be made to automatically correspond to the individual image data in the image data base. Therefore, the input works of two kinds, that is, the input of the image and the input of the registration data including the index data, necessary for registration can be executed separately so that efficiency of registration can be improved.

On the other hand, if the number of sheets of the images counted by the system is different from the number of sheets described in the formatting data, it is possible to determine that any mistake has occurred in the input work. Therefore, it is possible to raise a necessary alarm or to prevent the data transfer in the buffer lest incomplete data are registered in the image data base. The same processing is executed even when the number of the input images exceeds the number of sheets described in the header sheet.

The operator of the system can know from this alarm even after the input work that an input mistake has occurred. Since recording of incomplete data in the image data base can be avoided, it becomes possible by checking the title, for example, to know which document has not been inputted. In this manner, the operator can easily know later that the mistake has occurred in the input work of which document, even if a read mistake of the header sheet or the trailer sheet has occurred when a plurality of documents are registered. Therefore, the operator need not always stand by the system during the input of the images and registration efficiency can be improved. Though processing becomes different at portions depending upon the type of document or the entry type, they can be determined from the formatting data. In the case of a tab type document, for example, registration of each image can be recorded in the image data base by merely adding the respective connection data. However, the sequence number must be put to each image in order to registrate a book type document. Therefore, when the document is recognized as a book type document by the formatting data, the sequence number is generated in such a sequence that registration can be made most easily, and is put to each image. This processing makes it possible to registrate the book type document without relying upon the sequence number and to make the input work by use of ordinary automatic feeders. Accordingly, registration efficiency can be improved.

DESCRIPTION OF THE PREFERRED EMBODIMENTS

Hereinafter, the present invention will be described in further detail with reference to the accompanying drawings.

Figure 1:
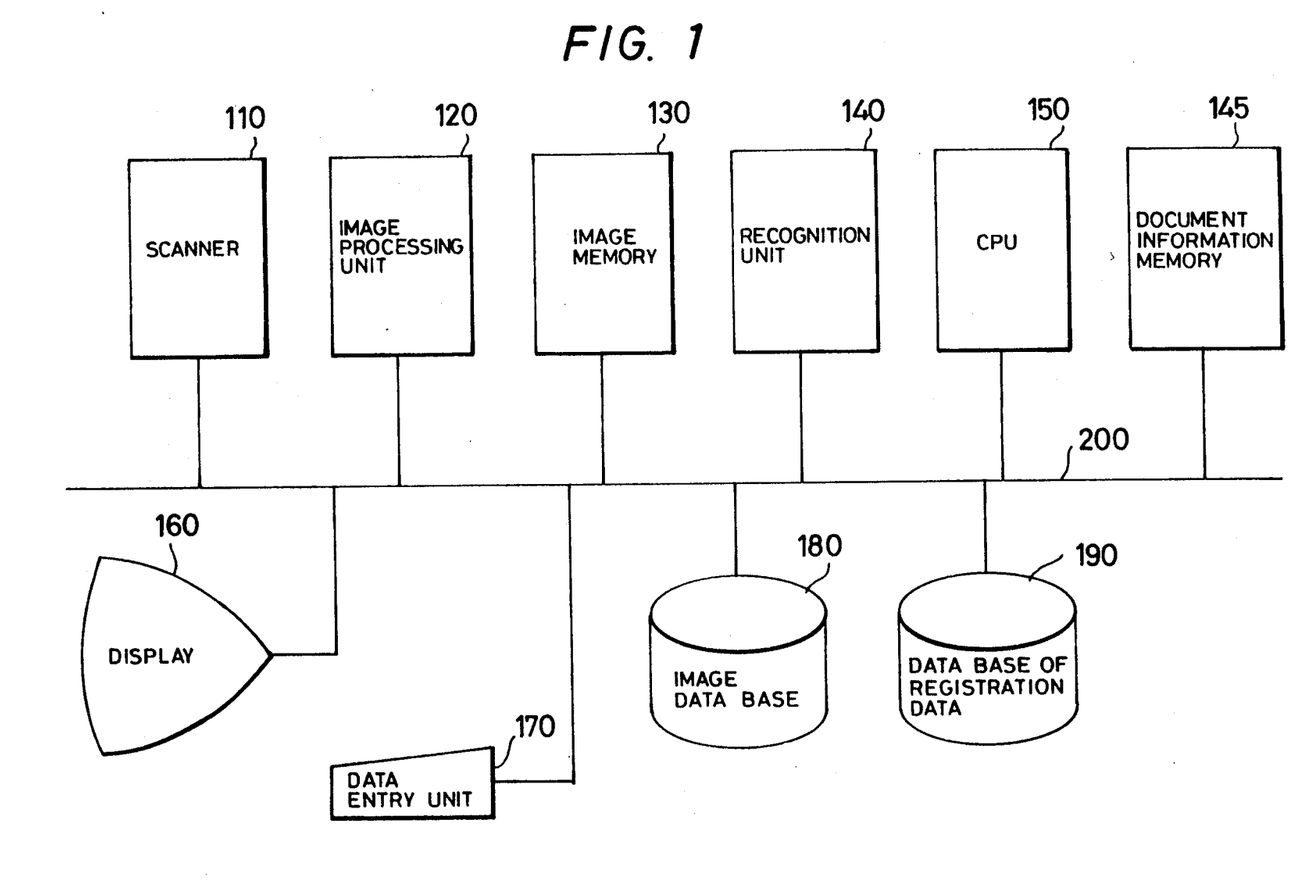
FIG. 1 is a block diagram showing one embodiment of the present invention.

FIG. 1 is a block diagram showing one embodiment of the present invention. In the drawing, reference numeral 110 represents a scanner capable of continuously reading the images of a plurality of documents by a known mechanism, 120 is an image processing unit for eliminating noise from the signals of the image that is read, 130 is an image memory having a memory capacity capable of recording the image of at least one document, 140 is a recognition unit for extracting necessary information from the signals in the image memory 130 and recognizing the content, 145 is a document information memory for storing temporarily the result of recognition, 150 is a control unit for controlling the operation and processing of the system as a whole, 160 is a display for displaying the images of the image memory 130, 170 is a data entry unit such as a keyboard for inputting commands and data into the system, 180 is an image data base for storing the images inputted from the scanner 110, 190 is a data base of registration data for storing the registration data inputted by the data entry unit 170, and the like, and 200 is a bus line for connecting the circuit elements described above. The data base of registration data 190 stores the registration data corresponding to the individual documents in the same number as the number of the documents.

The data base of registration data 190 consists of registration data that is used for search and connection data that is used for establishing correspondence to the data in the image data base. The registration data consists of bibliographic data such as titles and authors of documents and a keyword for searching, while the connection data establishes correspondence between the images inside the image data base and the registration data inside the registration data base for document. The content of the connection data includes, for example, the number of classter of a document and a document number inherent to each document. The term "classter" represents each classification item when a person who makes registration classifies each document in accordance with the content, author or the data of release of the document. Since a plurality of documents exist in each class, a peculiar number may be allotted to each document. Such a number is called the "document number". Other data for specifying each document can be used so long as they can be coded in a recognizable form.

Figure 2:
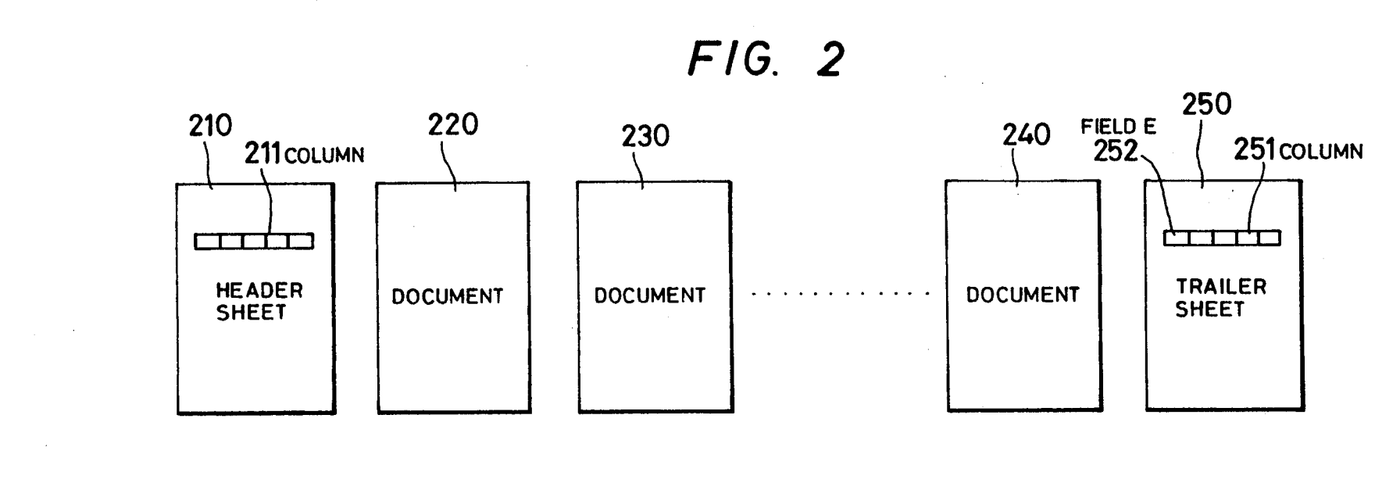
FIG. 2 shows the registration sequence when a book type document is registrated.

FIG. 2 shows the registration sequence of the original document image. The document to be registered in this case is a book type document by way of example. Reference numeral 210 represents a header sheet and 220, 230 and 240 represent document images as part of the book type document to be registered, respectively. Reference numeral 250 represents a trailer sheet representing the end of the document entry in the same form of document as the header sheet. The entry work is made by inputting sequentially the header sheet, then altogether the document and finally the trailer sheet from the left of the drawing.

Figure 3:
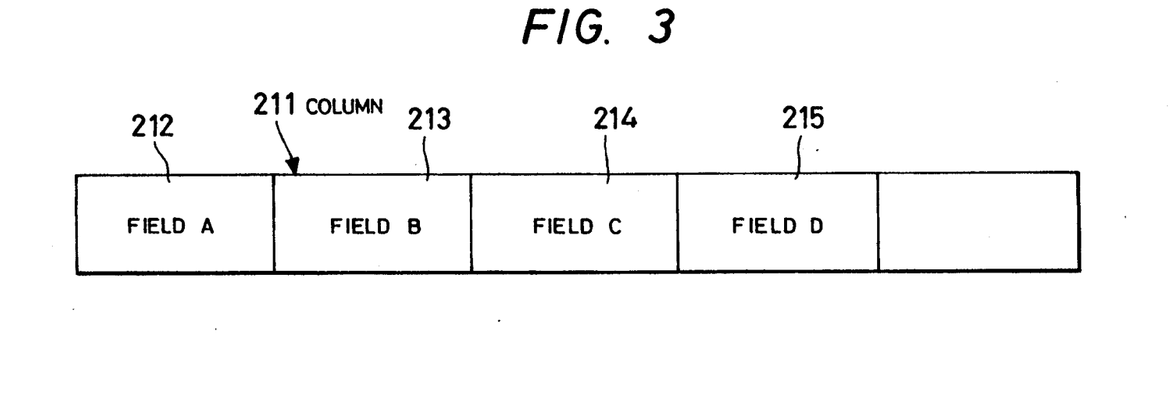
FIG. 3 shows fields of data relating to an original document image on a header sheet.
Figure 4:
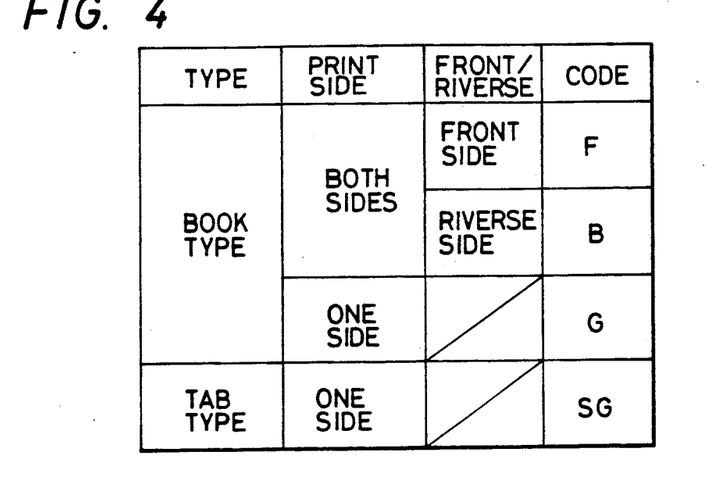
FIG. 4 shows format symbols of the type of an original document image and its entry type.

A column 211 of data relating to the entry document is put on the header sheet. FIG. 3 is an enlarged view of the column 211. Symbols representing the type of the document to be registered and an entry type are put into a field A212, while the symbol representing the classter is put into a field B213. Symbol representing the document number is put into a field C214 and symbol representing its number of sheet is put into a field D215. FIG. 4 shows an example of the symbols to be put into the field A212.

As shown in FIG. 4, three kinds of documents having different types and entry types are registered in this embodiment. First of all, processing of registration of a book type document that is written on both sides will be described. In accordance with this type the document is inputted one side by one. In this case, the symbols to be put into the field A212 are two kinds, that is, F and B, as shown in FIG. 4. They are used when inputting the front and reverse sides of the document, respectively. Their difference lies only in whether the sequence number is odd-numbered or even-numbered. It will be assumed that the input operation is made from the front side of the original document. Then, F is put into the field A212. The recognition unit 140 recognizes F as the content of the field A212 and then executes character recognition for the contents of the fields B213, C214 and D215 and obtains the classter, the document number and the number of sheet. The result of recognition is recorded in the document information memory. The connection data are put to all the images thus inputted as constituent elements of one document until a trailer sheet 250 is thereafter inputted. As a result, it becomes possible to establish correspondence between the registration data containing the same connection data as those in the data base of document information and all the images belonging to one document.

After recognition is complete, the images of the second sheet are read by the instruction of the control unit 150 and recorded in the image memory 130 through the same processing as the header sheet 210. As to the images, the recognition unit 140 checks only whether or not the column exists at the predetermined position. If the column is not judged as existing, the image is stored in the image memory 130. When only the front side of one document is inputted in this manner, the trailer sheet 250 is inputted, and the column 251 is found out in the trailer sheet 250 by the recognition unit 140. Next, the recognition unit 140 executes character recognition for the field E252 and when the symbol representing the end of entry is recognized here, registration of one side of one document is complete.

While the images are being read, the control unit 150 always counts the number of sheets of the images inputted, and compares the number of sheets of the images that have been inputted before confirmation of the entry of the trailer sheet 250 with the number of sheet of the document that is described in the field D215 on the header sheet. If they are found coincident as a result of comparison, the entry of the images is judged as being performed correctly, and the data stored in the image memory 130 is transferred to the image data base 180. At this time a flag representing the normal end of entry is recorded at the portion of the document information memory 145 where the document recognition data are stored.

On the other hand, if the trailer sheet 250 is judged as being inputted before the images of the number of sheet put into the field D215 have been inputted, any mistakes are judged as having occurred for some reason or other. This also holds true of the case where the trailer sheet 250 is not inputted even though the images of the sequence number put into the field D215 have been inputted normally. When the input mistake is judged as having occurred, transfer of the data stored in the image memory is not effected, and recording of normal end flag to the document information memory 145 is not made, either. This processing makes it possible for the operator to know easily the occurrence of the input mistake of any document when a plurality of documents are sequentially inputted, by displaying the flag on the display 160, whenever necessary.

Figure 5:
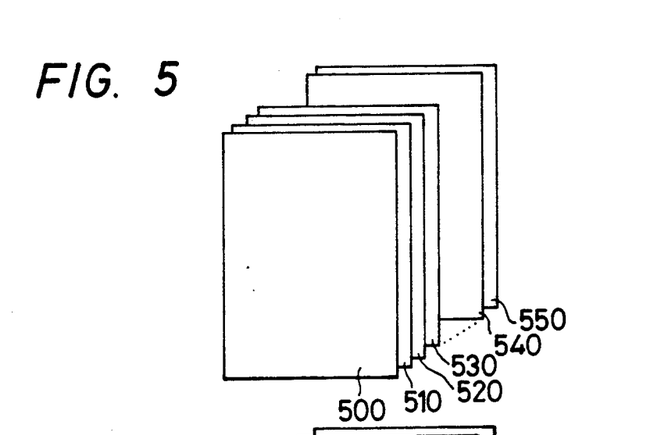
FIG. 5 shows the read sequence of images by an automatic feeder and the input sequence number.

When the book type document is registered, it becomes necessary to allot the number of sheet to each image and register it when the data on the image memory 130 is transferred to the image data base 180. This example deals with the case where only the front side of a document having the images at both sides is continuously inputted. In this case, assuming that N sheets of images are inputted, every other sequence number such as 1, 3, 5, ..., 2N−3, 2N−1 is allotted. On the other hand, when most of the documents in general are put upright with the description side facing up (or the front side facing up in the case of the documents that are written at both sides) as shown in FIG. 5, the number of sheet appears from the smaller side such as 500, 510, ..

., 550 whether the document may be written at one side or both sides. However, ordinary automatic feeders mostly read the document reversely in the sequence of 550, 540, . . . , 500 when they read the description sides of the document shown in FIG. 5. Therefore, if the number of sheet is arranged in the sequence of $2N-1$, $2N-3, \ldots, 3, 1$, there is no need to rearrange the document at the time of registration. The number of sheet thus arranged is sequentially inputted to the registration data corresponding to this document in the data base of document information.

After a series of the processings described above, registration of one side of the book type document is complete. However, the image data registered in the image data base 180 at this point of time covers only one side of the document. Therefore, a code or flag representing incompletion is put into the image data base 180 so that check can be made easily at a later stage.

Next, the reverse side of the document is inputted. Registration processing in this case is the same as that of the front side and the difference lies only in the symbol B that is put into the field 212 of the header sheet 210 and the arrangement of the sequence number. When the front side of the document is inputted by the automatic feeder, the sequence of document is likely to be reverse to that before the input work. Therefore, the sequence number is arranged in the sequence of $2, 4, \ldots, 2N-2$, $2N$. In this manner, registration of the book type document that is written at both sides is complete.

Figure 6:
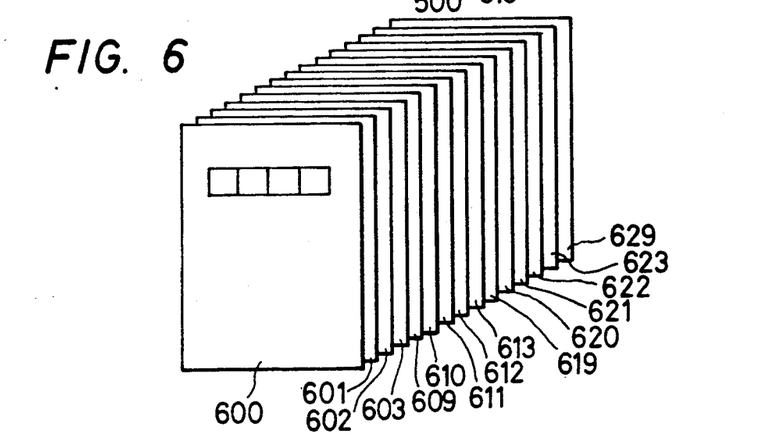
FIG. 6 shows the input sequence when a plurality of documents are continuously registrated.

Registration of the reverse side is carried out in the same way as in the case of the front side by checking the number of sheet of the input images. In the registration work in practice, a plurality of documents are often registered continuously. In such a case, one side of each of these documents is continuously inputted. The input sequence is shown in FIG. 6. Here, 600 corresponds to the header sheet of the first document, 601 to 603 are the first document, 609 is the trailer sheet of the first document, 610 is the header sheet of the second document, 611 to 613 are the second document, 619 is the trailer sheet of the second document, 620 is the header sheet of the third document, 621 to 623 are the third document and 629 is the trailer sheet of the third document.

The first document is registered in the manner described already. After the trailer sheet 609 of the first document is confirmed and the data in the image memory 130 is registered to the image data base 180, the header sheet 610 of the second document is read. Here, the apparatus confirms the header sheet 610 by its recognition unit 140. The confirmation method is the same as that of the trailer sheet 609, but distinguishes it from the trailer sheet 609 by reading the document information data described on it, or the like. After the header sheet 610 of the second document is confirmed, the images of the second document (from 611 to 613) are inputted in the same way as in the first document.

If the second header sheet 610 cannot be confirmed, the apparatus sequentially reads the images and continuously searches the next header sheet 620. The image data that have been read before the header sheet 620 is inputted are not registered. The operator can know easily that the second data are not registrated, by displaying the content of the document information memory 145 on the display 160.

If any recognition mistake of the trailer sheet 609 occurs for the first document, confirmation of the second header sheet 610 is made for each image that is read, after confirmation of the recognition mistake described above. In this case, too, the operator can know easily that the first data have not been registrated, by displaying the content of the document information memory 145 on the display 160.

The system described above makes it possible for the operator to know easily whether or not each of a plurality documents is correctly registrated when they are continuously inputted.

Processing for registering a book type document, that is written at one side, is substantially the same as above, too. When symbol G is recognized by recognition of the field 212, the number of pages generated becomes $N, N-1, \ldots, 2, 1$.

Next, the case where a tab type document is registrated will be described. In this case, a plurality of documents each consisting of one document image are continuously inputted. Therefore, a document number is different from document to document but the sequence number needs not be generated.

Figure 7:
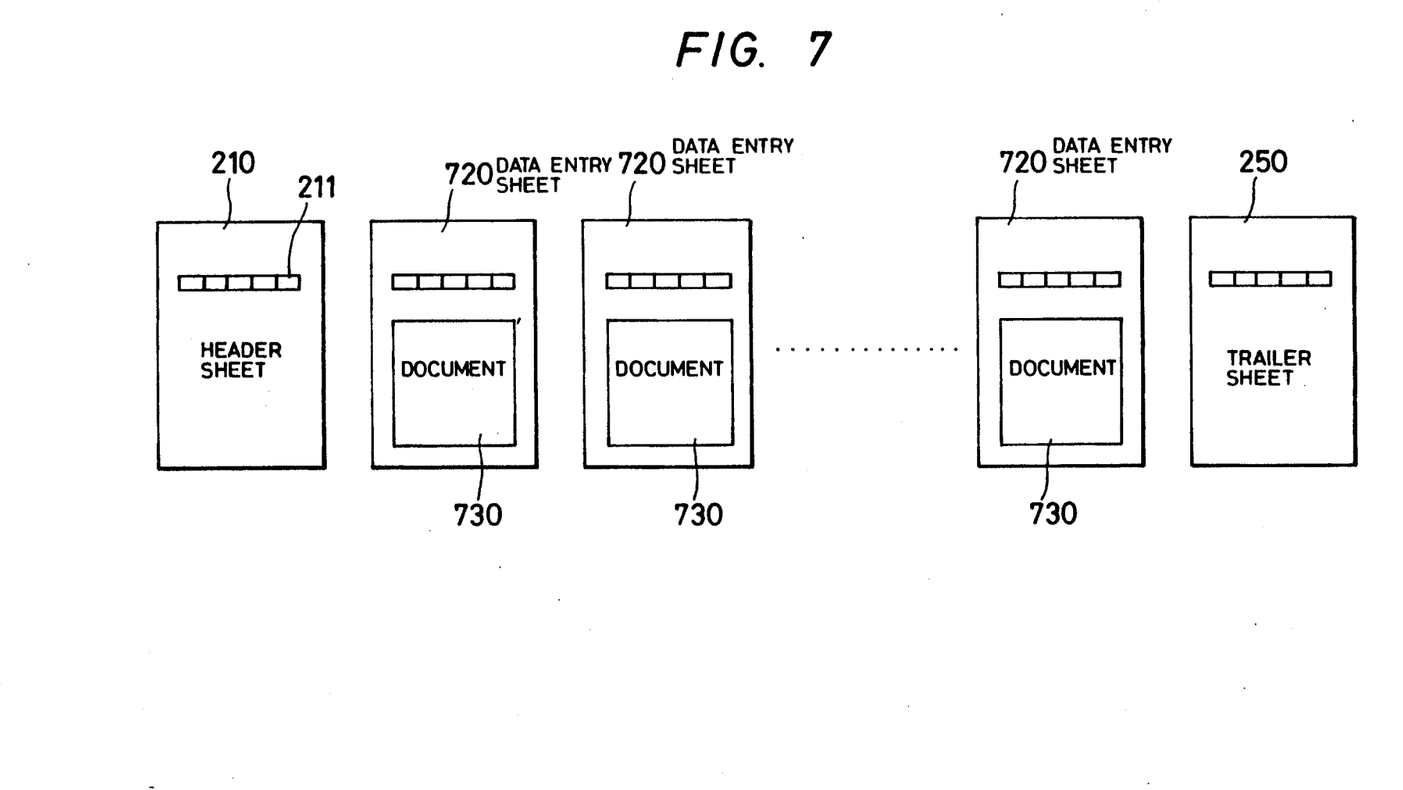
FIG. 7 shows the input sequence when a tab type document is registrated.

FIG. 7 shows the registration sequence of the tab type document. If detection error of the trailer sheet occurs in this case, too, the operation is made in the same way as in the case of the book type document.

Here, the case where a plurality of the same classter are registered will be described. Registration is made from the header sheet 210 having a symbol SG, which represents the registration of the tab type document, in its field A212. After confirming the symbol SG as the content of the field A212, the recognition unit 140 then executes character recognition for the content of the field B213 and recognizes the classter. This classter is allotted to all the documents that are registered before registration of the trailer sheet 250. Then, the documents are sequentially inputted and stored in the image data base, but at this time, the document number must be registered simultaneously with the documents. When registrating the tab type document, therefore, the tab type original document image 730 of the tab type document to be registrated is added to the data entry sheet 720 which has the same format as that of the header sheet but has only the document number put into its field C214, and is registered with this data entry sheet 720. The recognition unit 140 first examines the field A212 of the second document et seq., checks then whether it is the trailer sheet or not, executes character recognition if the entry sheet is the document and recognizes the document number. Correspondence between the registration data on the data base of document information 180 and the image in the same way as in the book type document from this document number and classter.

In this manner registration can be made efficiently irrespective of the type and entry type of the document to be registered.

As described above, correspondence can be established automatically in accordance with the present invention between the image on the image data base and the registration data on the data base of document information. Therefore, the input work corresponding to each of these two data bases can be carried out separately. When a book type document is registrated, too, continuous input by an automatic feeder becomes possible. As a result, image registration efficiency can be improved.

What is claimed is:

1. A system for registration of documents, comprising:

means for registering a document including:

first memory means for storing registration data of a document to be registered, said registration data includes index data for searching said document, and connection data which identifies said document as belonging to said registration data, said registration data and said connection data being inputted as code data by a keyboard, scanner means for inputting as image data, a document image corresponding to said document and document information data including connection data which identifies said document image as belonging to said registration data stored by said first memory means, recognition means for recognizing said document information data including connection data, and second memory means for storing said document image and said document information data including connection data recognized by said recognition means, wherein said document image stored in said second memory means is associated with said registration data having the same connection data stored in said first memory means by use of said connection data stored in the second memory means.

2. A system for registration of documents, according to claim 1, wherein said registration data further includes bibliographic data relating to said document.

3. A system for registration of documents, according to claim 1, wherein said connection data stored by said first memory means includes classter of said document and a document number.

4. A system for registration of documents, according to claim 1, wherein said document information data further includes format data relating to said document such as number of pages, form type and entry type.

5. A system for registration of documents, according to claim 4, wherein said document further contains data representing the end of entry of said document.

6. A system for registration of documents according to claim 5, further including means for counting a number of pages until said data representing the end of entry is detected and for comparing said counted number with said number of pages recognized by said recognition means as being indicated by said format data, when said counted number of pages is in agreement with said number of pages recognized by said recognition means as indicated by said comparison operation, said document image is stored in said second memory means, and when said counted number of pages is not in agreement with said number of pages recognized by said recognition means as indicated by said comparison operation, an alarm is displayed on a display unit.

7. A system for registration of documents, according to claim 6, wherein said document information data is inputted by a header sheet and said data representing the end of entry of said document is inputted by a trailer sheet.

8. A system for registration of documents, according to claim 7, wherein said document is a book type document.

9. A system for registration of documents, according to claim 7, wherein said document is a tab type document.

10. A method for registration of documents, comprising the steps of:

inputting by a keyboard and storing, in first memory means, registration data of a document to be registered, said registration data includes index data for searching said document, and connection data which identifies said document as belonging to said registration data, said registration data and said connection data being code data;

inputting, as image data, a document image corresponding to said document and document information data including connection data which identifies said document image as belonging to said registration data stored by said first memory means, by a scanner;

recognizing, by recognizing means, said document information data including connection data; and storing, in second memory means, said document image and said connection data recognized by said recognizing step;

wherein said document image stored in said second memory means is associated with said registration data having the same connection data stored in said first memory means by use of said connection data stored in the second memory means.

11. A method for registration of documents, according to claim 10, wherein said registration data further includes bibliographic data relating to said document.

12. A method for registration of documents, according to claim 10, wherein said connection data stored by said first memory means includes classter of said document and a document number.

13. A method for registration of documents, according to claim 10, wherein said document information data further includes format data relating to said document such as number of pages, form type and entry type.

14. A method for registration of documents, according to claim 13, wherein said document further contains data representing the end of entry of said document.

15. A method for registration of documents according to claim 14, further includes the steps of:

counting a number of pages until said data representing the end of entry is detected; and comparing said counted number with said number of pages recognized by said recognizing step as being indicated by said format data;

wherein when said counted number of pages is in agreement with said number of pages recognized by said recognizing step as indicated by said comparison operation, said document image is stored in said second memory means, and when said counted number of pages is not in agreement with said number of pages recognized by said recognizing step as indicated by said comparison operation, an alarm is displayed on a display unit.

16. A method for registration of documents, according to claim 15, wherein said document information data is inputted by a header sheet and said data representing the end of entry of said document is inputted by a trailer sheet.

17. A method for registration of documents, according to claim 16, wherein said document is a book type document.

18. A method for registration of documents, according to claim 16, wherein said document is a tab type document.

19. A system for registration of documents, comprising:

means for registering a document including:

first memory means for storing registration data and connection data as being associated with said registration data, said registration data including bibliographic data relating to a document to be registered and a keyword for searching said document, said registration data and said connection data being inputted as code data by a keyboard;

input means for inputting, as image data a document image corresponding to said document and document information data relating to said document, said document information data containing connection data which associates said document image with said registration data stored by said first memory means, recognition means for storing said document image as being related to said document information data including connection data recognized by said recognition means.

20. A system for registration of document, according to claim 19, wherein said connection data stored by said first memory means includes classter of said document and a document number.

21. A system for registration of documents, according to claim 19, wherein said document information data further includes format data relating to said document such as number of pages, form type and entry type.

22. A system for registration of documents, according to claim 21, wherein said document further contains data representing the end of entry of said document.

23. A system for registration of documents according to claim 22, further including means for counting a number of pages until said data representing the end of entry is detected and for comparing said counted number with said number of pages recognized by said recognition means as being indicated by said format data, when said counted number of pages in is agreement with said number of pages recognized by said recognition means as indicated by said comparison operation, said document image is stored in said second memory means, and when said counted number of pages is not in agreement with said number of pages recognized by said recognition means as indicated by said comparison operation, an alarm is displayed on a display unit.

24. A system for registration of documents, according to claim 23, wherein said document information data is inputted by a header sheet and said data representing the end of entry of said document is inputted by a trailer sheet.

25. A system for registration of documents, according to claim 24, wherein said documents is a book type document.

26. A system for registration of documents, according to claim 24, wherein said document is a tab type document.

* * * * *